(12) United States Patent
Brooker

(10) Patent No.: US 9,120,376 B2
(45) Date of Patent: Sep. 1, 2015

(54) SYSTEM AND METHOD FOR OPERATING A LARGE SINGLE ENGINE SWEEPER

(71) Applicant: Alamo Group, In., Seguin, TX (US)

(72) Inventor: Robert A Brooker, Dover, OH (US)

(73) Assignee: Alamo Group, Inc., Seguin, TX (US)

(*) Notice: Subject to any disclaimer, the term of this patent is extended or adjusted under 35 U.S.C. 154(b) by 0 days.

(21) Appl. No.: 14/512,727

(22) Filed: Oct. 13, 2014

(65) Prior Publication Data

US 2015/0047914 A1    Feb. 19, 2015

Related U.S. Application Data

(63) Continuation of application No. 13/466,532, filed on May 8, 2012, now Pat. No. 8,915,327.

(51) Int. Cl.
| | |
|---|---|
| B60K 17/04 | (2006.01) |
| B60K 25/06 | (2006.01) |
| B60W 10/06 | (2006.01) |
| B60W 10/30 | (2006.01) |
| B60W 30/188 | (2012.01) |
| E01H 1/05 | (2006.01) |
| B60K 26/02 | (2006.01) |

(52) U.S. Cl.
CPC .............. *B60K 25/06* (2013.01); *B60K 17/04* (2013.01); *B60K 26/02* (2013.01); *B60W 10/06* (2013.01); *B60W 10/30* (2013.01); *B60W 30/1888* (2013.01); *E01H 1/05* (2013.01); *B60K 2025/065* (2013.01); *B60Y 2200/141* (2013.01); *Y10T 29/49826* (2015.01)

(58) Field of Classification Search
CPC .. B60K 2025/065; B60K 26/02; B60K 25/06; B60K 17/04; B60Y 2200/141; E01H 1/05; B60W 30/1888; B60W 10/30
USPC ..................... 15/78; 180/291, 305, 306, 307
See application file for complete search history.

(56) References Cited

U.S. PATENT DOCUMENTS

| | | | | |
|---|---|---|---|---|
| 4,530,416 A * | 7/1985 | Kassai | ........................ | 180/307 |
| 4,554,992 A * | 11/1985 | Kassai | ........................ | 180/307 |
| 6,073,720 A * | 6/2000 | Vanderlinden | ............... | 180/307 |
| 2002/0043420 A1* | 4/2002 | Otsuni et al. | .................. | 180/307 |
| 2005/0155170 A1* | 7/2005 | Charky et al. | ..................... | 15/78 |
| 2010/0216593 A1* | 8/2010 | Ekonen et al. | ................ | 475/295 |
| 2013/0078066 A1* | 3/2013 | Vanderlinden | ............... | 414/539 |

* cited by examiner

*Primary Examiner* — Brodie Follman
*Assistant Examiner* — Brian Cassidy
(74) *Attorney, Agent, or Firm* — Alan R. Thiele; William H. Quirk; Rosenthal Pauerstein Sandoloski Agather LLP

(57) ABSTRACT

A system and method for operating a large single engine sweeper includes a two-mode transfer case assembly inserted into the chassis drive train of the vehicle on which a package of sweeping equipment is mounted. In road mode operation, power from the chassis engine passes through a chassis automatic transmission, through a two-mode transfer case assembly to the differential and real wheel assembly. In sweep mode, power passes from a propel hydraulic motor into the two-mode transfer case assembly and then to the differential and real wheel assembly.

11 Claims, 3 Drawing Sheets

SYSTEM AND METHOD FOR OPERATING A LARGE SINGLE ENGINE SWEEPER

CROSS REFERENCE TO RELATED APPLICATION

This application is a Continuation of U.S. patent application Ser. No. 13/466,532, filed on May 8, 2012, entitled "System and Method for Operating a Large Single Engine Sweeper" and claims the benefit of Provisional U.S. Patent Application Ser. No. 61/614,949, filed Mar. 23, 2012, entitled "Large Single Engine Sweeper".

STATEMENT REGARDING FEDERALLY FUNDED RESEARCH AND DEVELOPMENT

The invention described in this patent application was not the subject of federally sponsored research or development.

FIELD

The present invention relates to the engine power control system for a large single engine sweeper.

BACKGROUND

Powered mechanical sweepers typically come in three sizes. The smallest size is used for sweeping sidewalks and factory floors. Operators of small sweepers may either walk behind the sweeper or ride on a small seat positioned behind the sweeping mechanism. Medium size sweepers are used for cleaning parking lots and small roads such as private roads or long driveways. Large sweepers are typically found on large public roads or on vast expanses of concrete surfaces such as found in commercial airports.

A medium size sweeper is one in which the sweeper is either pulled behind a tractor or where the sweeping equipment is mounted on the chassis of a small truck. The operator of a medium size sweeper will travel at road speeds to the location to be swept. Once at the location to be swept, the operator of the medium size sweeper engages the sweeping mechanism. With the sweeping mechanism engaged, the operator of the medium size sweeper uses the engine and transmission of either the tractor or small truck to control both the direction (forward and reverse) and speed of the sweeper when passing back and forth over the area to be swept. Speed control of the medium size sweeper over the surface being swept is typically accomplished by the foot pressure applied by the operator of the sweeper on the accelerator pedal or the foot brake to slow the sweeping vehicle using an automotive type friction braking system.

A large size powered sweeper typically includes a dedicated or modified truck chassis. However, the size of the areas to be swept, along with the type and quantity of debris expected to be encountered, necessitate the use of large brooms, large fans, and the capacity for picking up large pieces of debris along with a debris body for transporting a large amount of swept-up debris. One example of such a large sweeper is the VacAll™ Legacy model sweeper which is manufactured and marketed by the Gradall Division of the Alamo Group, the assignee of this U.S. Patent Application.

Because of the size of a large sweeper, as distinguished from a medium size sweeper, and the additional power needed to operate the sweeping equipment on large sweepers, prior art large sweepers have typically included two internal combustion engines. One internal combustion engine is the truck chassis engine. As on the medium size sweepers described above, the truck chassis engine is always mechanically connected to the chassis drive train. As will be well understood by those of ordinary skill in the art, attached to the chassis engine is a chassis transmission; typically, an automatic transmission. The chassis automatic transmission is connected by a driveshaft to the chassis differential and a rear wheel drive assembly. The chassis differential and the rear wheel assembly provide the power necessary to turn the rear wheels. The rear wheels propel the large sweeper to travel both at road speed to the location to be swept and then at sweeping speed over the surface being swept. Thus, whether traveling along a highway or working at a location that needs to be swept, the input by the operator of the sweeper to change the ground speed of the sweeper is by both placing foot pressure on the accelerator pedal to control the engine rpm and the selection of the gear in the chassis automatic transmission.

The second internal combustion engine in a large sweeper, typically referred to as an auxiliary engine, is usually mounted on the vehicle chassis behind the driver's compartment. This second internal combustion engine provides power to the sweeping equipment. When the large sweeper arrives at the large area, runway or road to be swept, the second internal combustion engine is put into operation. The operator of the vehicle with the sweeping equipment mounted thereon then drives the vehicle at a slow speed over the area to be swept.

The chassis internal combustion engine that comes with the vehicle chassis is used to propel large prior art sweepers using the chassis drive train. In some prior art sweepers, the sweeper moves too fast over the surface being swept. Accordingly, the operator of the sweeper must control the speed of the sweeper by maintaining continuous variable pressure on the brake pedal.

The second internal combustion engine is used to provide the power needed to operate all of the sweeping mechanisms. Unlike the chassis internal combustion engine, the second internal combustion engine typically bears an EPA rating as an off-road engine. The second internal combustion engine typically has its own cooling and air intake systems. The fuel tank and batteries for the second internal combustion engine are typically shared with the chassis internal combustion engine. Controls available to the operator provide for operating the variable speed broom motors and some of the sweeping functions; however, most everything regarding the sweeping operation runs at a speed directly proportional to the speed of the second internal combustion engine.

The disadvantages of operating a large sweeper having two internal combustion engines are the large amount of fuel consumed from the operation of two internal combustion engines, the wear and associated maintenance required to keep two internal combustion engines in operating condition as opposed to one internal combustion engine, and the noise and vibration from two internal combustion engines. Such noise and vibration has been shown to result in driver fatigue. In addition, since the brakes which are part of the vehicle chassis assembly are used to control the speed of the large sweeper in sweep mode, more frequent replacement of the brake pads, brake drums, or brake rotors on the wheel brakes is required.

Accordingly, there is a need for a large sweeper that reduces fuel consumption, reduces wear and maintenance, reduces noise and vibration, and does not require frequent replacement of parts of the wheel brake assemblies.

Attempts have been made to create a street cleaning vehicle with a single engine. One such example is shown in U.S. Pat. No. 6,073,720 to Vanderlinden. Therein, a power take-off from the chassis transmission is connected to a hydraulic pump. The hydraulic pump is connected to a hydraulic motor which is mounted on and is mechanically connected to the rear chassis differential. Power from the single chassis engine is also used to drive the sweeping equipment mounted on the chassis of the vehicle. Those of ordinary skill in the art will understand that the system disclosed in U.S. Pat. No. 6,073,720 to Vanderlinden requires modifying the chassis transmission and the rear chassis differential. Such modification of chassis components by a sweeper manufacturer is both expensive and typically voids the warranty on the chassis drive system components by the manufacturer of the vehicle chassis assembly. Because of these problems, the single engine sweeper proposed in U.S. Pat. No. 6,073,720 by Vanderlinden has not been generally accepted by the sweeper industry in the United States.

Thus, the need still remains in the art for a large sweeper having a single internal combustion engine. Those of ordinary skill in the art will understand that as more demands are put on a single internal combustion engine in a large sweeper, more control inputs are required of the vehicle operator to manage both the distribution of power between the vehicle and the sweeping equipment while guiding and controlling the speed and the direction of the large sweeper over the large area to be swept. Accordingly, there is an additional need to retain all of the advantages of a large vehicle chassis when not sweeping and to provide a separate system for controlling the speed of the vehicle when sweeping.

SUMMARY

The system and method for operating a large single engine sweeper of the present invention includes a two-mode transfer case inserted into the drive train of the vehicle on which the sweeping equipment is mounted. A front drive shaft extends from the rear of the chassis automatic transmission to the front side of the two-mode transfer case. A rear drive shaft extends from the back side of the two-mode transfer case to the chassis differential and rear wheel drive assembly.

In travel mode, power from the chassis engine passes from the chassis engine through the chassis automatic transmission, through the two-mode transfer case and to the chassis differential and rear wheel drive assembly. The two-mode transfer case acts effectively as if it is not there in travel mode as it performs no mechanical function.

In sweep mode, power passes from the chassis engine from the chassis automatic transmission to the front side of the two-mode transfer case. The gear trains within the two-mode transfer case are set so that torque input from the chassis engine through the automatic transmission no longer passes directly through the two-mode transfer case. Rather, the torque to the front of the two-mode transfer case provides the necessary torque to operate the hydraulic pumps which provide hydraulic fluid to the hydraulic motors and hydraulic cylinders used with the sweeping equipment. This interruption of the flow of mechanical power transforms the nature of the vehicle. Specifically, torque no longer follows a direct path from the chassis engine to the rear wheels.

At the same time that the flow of mechanical power from the chassis engine to the rear wheels is interrupted, the two-mode transfer case now provides mechanical power to a hydraulic propel pump. The hydraulic propel pump provides a power input to the hydraulic propel motor mounted on the back side of the two-mode transfer case to a second gear train within the two-mode transfer case. This second gear train within the two-mode transfer case provides a torque output to the rear drive shaft and then to the chassis differential.

Thus, when the large single engine sweeper is placed in sweep mode, the flow of mechanical power through the two-mode transfer case from the chassis automatic transmission is interrupted so that mechanical power from the chassis automatic transmission no longer flows directly to the chassis differential and rear wheel drive assembly. Instead, the mechanical power to the chassis differential and rear wheel drive assembly originates at the hydraulic propel pump and the hydraulic propel motor and then passes into the two-mode transfer case. From the two-mode transfer case, the mechanical power provided from the propel hydraulic pump and the hydraulic propel motor turns the chassis differential and rear wheel drive assembly to move the sweeper across the surface to be swept when in sweep mode.

When in sweep mode, the position of the accelerator pedal no longer provides input to the system which controls the speed of operation of the chassis engine. Instead, in sweep mode, the chassis engine may be set at a predetermined speed and the movement of the accelerator pedal by the vehicle operator is now connected to another system which controls the flow of hydraulic fluid from the propel hydraulic pump and is disconnected from the system which controls the rpm of the chassis engine. The flow of fluid from the propel hydraulic pump to the propel hydraulic motor then controls the speed of the large single engine sweeper instead of the engine speed. Thus, when sweeping, the operator of the vehicle uses the accelerator; however, movement of the accelerator pedal by the vehicle operator causes the speed of the large single engine sweeper to be controlled in an entirely different way.

BRIEF DESCRIPTION OF THE DRAWING FIGURES

A better understanding of the system and method for operating a large single engine sweeper may be had by reference to the drawing figures, wherein.

DESCRIPTION OF THE EMBODIMENTS

Figure 1:
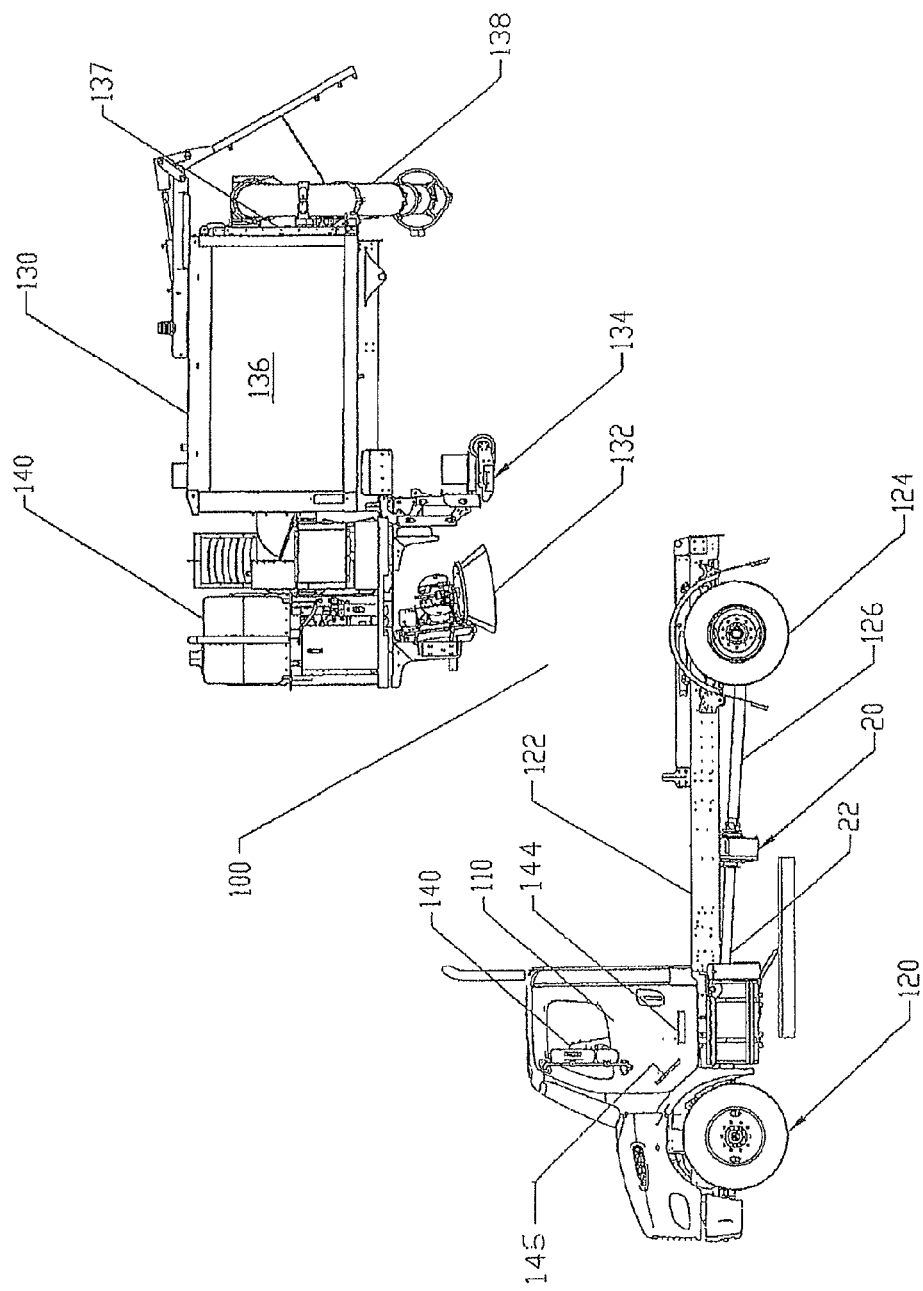
FIG. 1 is an exploded side elevational view of the large single engine sweeper of the present invention.

An exploded view of the large single engine sweeper 100 of the present invention appears at FIG. 1. The front portion of the vehicle includes a cab 110 for the vehicle operator. The cab sits on the vehicle chassis assembly 120. As is known to those of ordinary skill in the art, the vehicle chassis assembly 120 includes a chassis engine 127 located near the vehicle operator's cab 110. A chassis automatic transmission 128 is attached to the chassis engine 127. The chassis engine 127, chassis automatic transmission 128, and cab 110 for the vehicle operator sit on frame rails 122. The frame rails 122 extend behind the vehicle operator's cab 110 to the rear drive wheels 124. A chassis driveshaft assembly 126 provides power to the rear drive wheels 124 through a chassis differential and rear axle assembly 129. Most of the manufacturers of prior art sweepers purchase the rolling vehicle chassis assembly 120 and vehicle operator's cab 110, as shown in FIG. 1, from a truck manufacturer and then mount a freestanding sweeping equipment package 130 powered by a second internal combustion engine on the frame rails 122.

The sweeping equipment package 130 may include a large rotating broom and/or one or more gutter brooms 132. Located near the centerline of the vehicle chassis assembly 120 is a suction or vacuum head 134 for picking up debris such as rocks, stones, bottles, pieces of asphalt, along with wet and dry leaves. A negative pressure at the suction or vacuum head 134 results from the air flow created by a large fan (not shown). The material picked up by the suction or vacuum head 134 passes into a large tiltable debris body 136. A hingedly mounted, hydraulically operated tailgate 137 enables emptying the debris body 136. In some sweepers, an intake or pick up tube 138 is mounted on the back of the debris body 136 and is used for manually picking up leaves or other types of debris. Many sweepers also include a water tank 140. Water from the water tank 140 passes through a hydraulically powered water pump to a wand or sprayer to loosen debris dried on the surface being swept, as well as dust control.

All of the equipment in the sweeping equipment package 130, to include the brooms, the fan creating the air flow which results in a negative pressure at the suction or vacuum head, and the water pump is operated by hydraulic motors. The operating parts within the sweeping equipment package 130 are positioned by the use of hydraulic cylinders. The hydraulic fluid which enables the hydraulic motors to produce the needed rotational torque and the hydraulic cylinders to provide the needed linear force comes from one or more hydraulic pumps.

Figure 2:
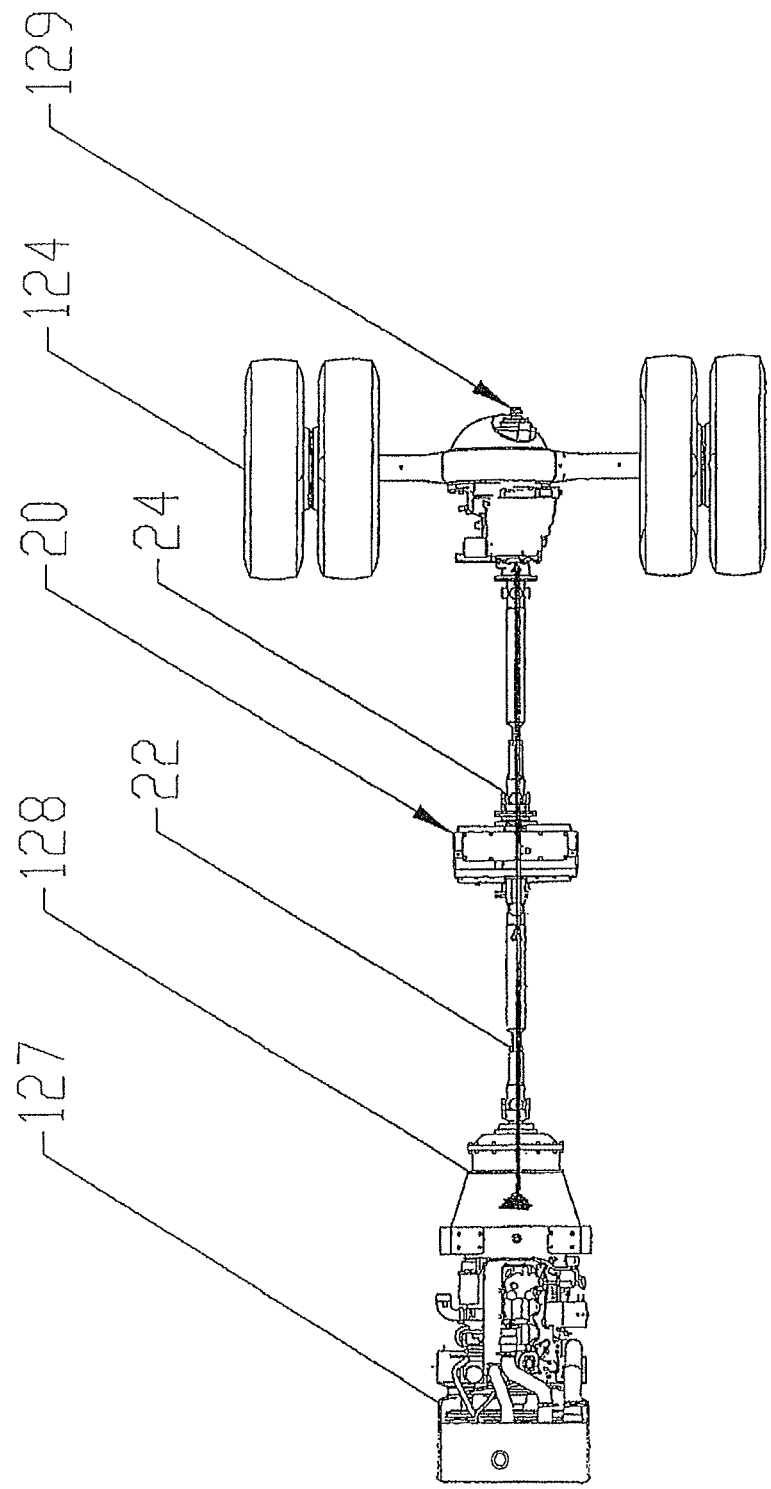
FIG. 2 shows a line representing the flow of power superimposed over the drive train indicating the path taken by the power from the chassis engine when the large single engine sweeper is in road mode.

In the disclosed invention, located about halfway between the vehicle operator's cab 110 and the rear drive wheels 124 in FIG. 1 is a two-mode transfer case 20. The two-mode transfer case 20 receives rotational power from the chassis automatic transmission 128 through a front drive shaft 22. When the vehicle 100 is in road mode as shown in FIG. 2; that is, traveling from one location to another between sweeping jobs, the rotational power from the chassis automatic transmission 128 passes directly through the two-mode transfer case 20 to the chassis differential and rear axle assembly 129 via a rear drive shaft 24 where the rotational power is used to turn the rear drive wheels 124.

Figure 3:
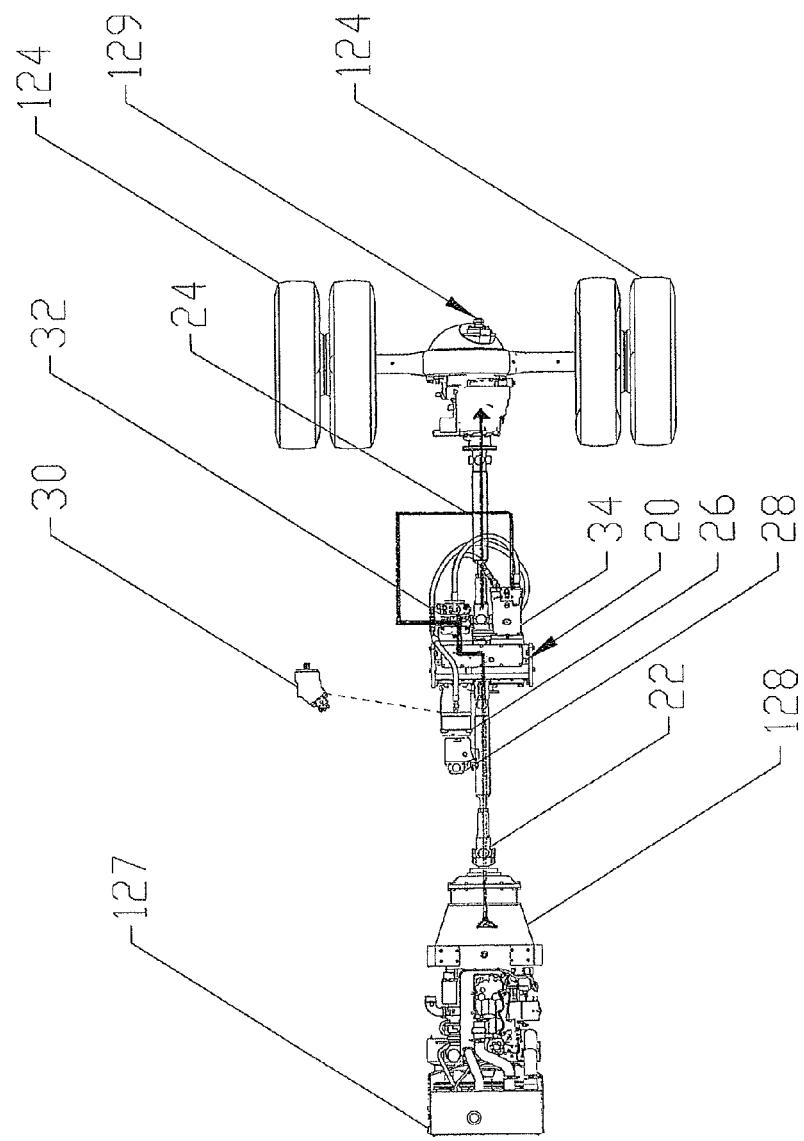
FIG. 3 shows a line representing the flow of power superimposed over the drive train indicating the path taken by the power from the chassis engine when the large single engine sweeper is in sweep mode.

As shown in the schematic of FIG. 3, when the gears in the two-mode transfer case 20 are shifted from the first mode into the second mode, the two-mode transfer case 20 is then used to provide rotational power to multiple hydraulic fluid pumps such as the fan hydraulic pump 26 and the implement hydraulic pump 28 when the large single engine sweeper 100 is in sweep mode. The fan hydraulic pump 26 on the left front of the two-mode transfer case 20 provides rotational power to a fan motor 30. The fan motor 30 turns the large suction fan which creates a negative pressure at the suction or vacuum head 134.

Another rotational power output from the two-mode transfer case 20 provides rotational power to an implement hydraulic pump 28. The implement hydraulic pump 28 provides hydraulic fluid to the hydraulic motors which turns the brushes and pumps the water, as well as the other hydraulic motors and/or hydraulic cylinders which are used to move and position the various operating parts of the sweeper equipment.

Shown on the right rear of the two-mode transfer case 20 in FIG. 3 is the propel hydraulic pump 32. The propel hydraulic pump 32 provides hydraulic fluid to a propel hydraulic motor 34. The rotational power from the propel hydraulic motor 34 passes back into the transfer case assembly 20. The propel hydraulic motor 34 is mechanically connected to the rear drive shaft 24 within the two-mode transfer case 20. Thus, in sweep mode, it is the propel hydraulic motor 34 which is mechanically connected to the differential and rear axle assembly 129 by the rear drive shaft 24 and causes the rear drive wheels 124 to rotate.

When the large single engine sweeper 100 is in sweep mode, no rotational power from the chassis engine 127 passes directly through the two-mode transfer case 20 to turn the rear drive wheels 124. Instead, the rotational power from the chassis automatic transmission 128 goes to the two-mode transfer case 20 to operate the hydraulic propel pump 32 along with the other hydraulic pumps. Hydraulic fluid from the hydraulic propel pump 32 goes to the hydraulic propel motor 34. Rotational power from the hydraulic propel motor 34 goes back into the two-mode transfer case 20. The rotational power from the hydraulic propel motor 34 that goes back into the two-mode transfer case 20 is used to turn the rear drive shaft 24 which connects the two-mode transfer case 20 to the chassis differential and rear axle assembly 129. When in sweep mode, all of the power used to propel the sweeper 100 forward is received from the hydraulic propel motor 34.

Operation

The large single engine sweeper 100, according to the present invention, is driven in road or travel mode to a location where sweeping is to take place. Power from the chassis engine 127 passes through the chassis transmission 128 to the two-mode transfer case 20. From the two-mode transfer case 20, the rotational power passes to the chassis differential and rear axle assembly 129 to power the rear drive wheels 124.

When the large single engine sweeper 100 arrives at the location to be swept, the single engine large sweeper 100 is ready to be placed in sweep mode.

Placing the large single engine sweeper 100 in sweep mode requires that the operator of the large single engine sweeper 100 bring the vehicle to (a) a full stop, (b) shift the chassis automatic transmission 128 into Neutral, and (c) set the parking brake 144 located within the vehicle operator's cab 110. The sweep mode is now engaged by the operator of the large single engine sweeper 100 by pressing a button on the control panel 140 which operates the engine power control system of the present invention. With the sweep mode engaged, the chassis automatic transmission 128 is placed into Drive. Shifting the chassis automatic transmission 128 out of Drive will disengage the sweep mode.

In sweep mode, the two-mode transfer case 20 provides rotational power to all of the hydraulic pumps which supply hydraulic fluid to the hydraulic motors and to the hydraulic cylinders found in the sweeping equipment package 130. In addition, the flow of rotational power from the chassis automatic transmission 128 through the two-mode transfer case 20 to the chassis differential and rear axle assembly 129 is interrupted at the two-mode transfer case 20. Instead, the two-mode transfer case 20 receives power from the hydraulic propel motor 34. This power from the hydraulic propel motor 34 passes through the rear drive shaft 24 between the two-mode transfer case 20 and the chassis differential and rear axle assembly 129.

When the vehicle operator places the single engine sweeper 100 in sweep mode by pressing on the button on the control panel 140, the chassis engine 127 is set to operate at a predetermined fixed rpm by the control system. Once this predetermined fixed chassis engine rpm is set, it cannot be changed by the vehicle operator. Control over the forward speed of the large single engine sweeper now completely depends on the flow of hydraulic fluid from the propel hydraulic pump 32 to the propel hydraulic motor 34. In sweep mode, control of the flow of hydraulic fluid from the propel hydraulic pump 32 is controlled by the movement of a swash plate in the propel hydraulic pump 32. The movement of the swash plate in the propel hydraulic pump 32 is controlled by an electronic signal related to the position of the accelerator pedal 145. The accelerator pedal is the same pedal normally used to govern the speed of the chassis engine 127 when in road mode. When the driver pushes down on the accelerator pedal, the output of hydraulic fluid from the propel hydraulic pump 32 increases, thereby causing the power output of the propel hydraulic motor 43 to increase, and the large single engine sweeper 100 will move across the surface being swept at a faster speed. If the vehicle operator of the large single engine sweeper 100 reduces the foot pressure on the accelerator pedal 145, the large single engine sweeper will slow down. If the operator removes all foot pressure from the accelerator pedal 145, the large single engine sweeper 100 will slow to a stop. If something were to happen to the vehicle operator of the large single engine sweeper 100, and assuming that the foot of the vehicle operator falls away from the accelerator pedal 145, the system will act like a dead-man control.

The vehicle operator can turn the speed limiter on and set the maximum travel speed for the large single engine sweeper 100 depending on the vehicle operator's assessment of the area to be swept. With the speed limiter on and set, fully depressing the accelerator pedal 145 will achieve the pre-set maximum speed. As indicated above, if the operator of the large single engine sweeper 100 reduces foot pressure from the accelerator pedal, the large single engine sweeper 100 will slow down and eventually come to a stop. With or without the speed limiter on, the accelerator pedal position is proportional to the speed of the large single engine sweeper 100. With the speed limiter on, the large single engine sweeper 100 will move from zero (vehicle operator's foot off the accelerator pedal 145) to the pre-set maximum speed on the speed limiter (accelerator pedal 145 fully depressed). And, as indicated above, if something were to happen to the vehicle operator, the large single engine sweeper 100 will come to a stop assuming that the foot of the vehicle operator falls away from the accelerator pedal 145. Thus, the system acts like a dead-man switch deactivating the hydraulically operated propel system after a short pre-set period of time. The maximum speed of the large single engine sweeper 100 while the speed limiter is engaged can be either changed or disengaged whether the large single engine sweeper 100 is moving and whether or not the accelerator pedal 145 is depressed.

Because of the increased ability of the vehicle operator to selectively control the speed of the large single engine sweeper 100 in sweep mode, there is little reason to use the brakes to control the speed of the large single engine sweeper 100 except for emergency stops or holding the large single engine sweeper 100 in position on a grade. In addition, the continuous input of foot pressure on the accelerator pedal 145 protects the vehicle operator in the case of an event where the vehicle operator is no longer able to operate the large single engine sweeper 100. When foot pressure is taken off the accelerator pedal 145, the large single engine sweeper 100 will come to a stop, and the propel system becomes deactivated after a short pre-set period of time.

When the sweeping job has been completed, the large single engine sweeper 100, while still in sweep mode, is brought to a stop. By pressing the auto store button on the control panel 140, everything that was running in the sweeper equipment package 130 is shut off and the sweeper equipment package 130 is put in the storage location. The parking brake 144 is set by the vehicle operator and the chassis automatic transmission 128 is shifted into Neutral. A toggle switch on the control panel 140 is labeled "road mode" on the top and "sweep mode" on the bottom. The operator may now press the "road mode" button. The two-mode transfer case 20 shifts after the parking brake 144 is set and the chassis automatic transmission 128 is placed in Neutral.

When the sweeping job has been completed, as indicate above, the sweeping equipment is positioned in its storage location for transport to another area to be swept. The large single engine sweeper 100 is then taken out of sweep mode and placed back into road mode. Rotational power from the chassis engine 127 and chassis automatic transmission 128 now passes directly through the two-mode transfer case 20 to the chassis differential and rear axle assembly 129.

Those of ordinary skill in the art will understand that the engine power control system of the disclosed invention provides several advantages over large sweepers having two internal combustion engines, as follows.

1. Lowered exhaustion emissions and lower fuel consumption.
2. Quieter operation and less vibration because of lower engine speed.
3. Less maintenance and replacement of components subject to wear and less adjustment of engine components.
4. Less operating cost.
5. Accurate vehicle operator selected vehicle speed control and dynamic hydraulic braking while in sweep mode from simply changing only the position of the accelerator pedal in the vehicle operator's cab.

Those of ordinary skill in the art will also understand that while the present invention has been explained with regard to its use on a large sweeper, the disclosed invention may be adapted for use on smaller sweepers.

What is claimed is:

1. A large single engine sweeper operable in either a road mode or a sweep mode, said large single engine sweeper including a rolling vehicle chassis, said rolling vehicle chassis being constructed and arranged for the mounting and positioning of a chassis brake system, a chassis engine, a chassis automatic transmission connected to said chassis engine, a front drive shaft connected to said chassis transmission, a two-mode transfer case connected to said front drive shaft, a rear drive shaft connected to said two-mode transfer case, and a chassis differential and rear wheel drive assembly attached to said rear drive shaft along with a debris pick-up and picked-up debris containment system mounted on said rolling vehicle chassis, said chassis engine speed being controlled by the position of a variable position accelerator pedal when the large single engine sweeper is in road mode, said large single engine comprising:

a propel hydraulic pump and propel hydraulic motor combination constructed and arranged to receive mechanical torque from the two-mode transfer case in the sweep mode;

said propel hydraulic motor constructed and arranged to provide mechanical torque to said two-mode transfer case for moving the large single engine sweeper in the sweep mode;

means for controlling the hydraulic fluid output of said propel hydraulic pump to said propel hydraulic motor using the variable position accelerator pedal when the large single engine sweeper is in sweep mode;

whereby in the sweep mode, said variable position accelerator pedal is disconnected from the chassis engine speed control and connected to said propel hydraulic pump to control the flow of hydraulic fluid to said propel hydraulic motor and when returned to the road mode, the variable position accelerator pedal is disconnected from said propel hydraulic pump and reconnected to the chassis engine speed control.

2. The large single engine sweeper as defined in claim 1 wherein said chassis engine operates at a predetermined rpm in the sweep mode.

3. The large single engine sweeper as defined in claim 1 wherein said chassis transmission operates in a predetermined gear range in the sweep mode.

4. The large single engine sweeper as defined in claim 1 wherein the speed of the chassis differential and rear wheel drive in the sweep mode is dependent on the output of mechanical torque from the propel hydraulic motor to the two-mode transfer case and from the two-mode transfer case to the rear drive shaft.

5. The large single engine sweeper as defined in claim 1 wherein the variable position accelerator pedal is used to control the position of a swash plate in the propel hydraulic pump which controls the flow of hydraulic fluid from the propel hydraulic pump to the propel hydraulic motor.

6. The large single engine sweeper system as defined in claim 1 wherein the speed of the large single engine sweeper in the sweep mode may be varied from zero to a predetermined maximum speed by varying the position of the variable position accelerator pedal.

7. The large single engine sweeper as defined in claim 1 wherein the speed of the vehicle in sweep mode when the accelerator pedal is fully depressed is set by the vehicle operator.

8. The large single engine sweeper as defined in claim 1 wherein the chassis brake system is used only in the event of an emergency stop or to hold the position of the large single engine sweeper on a grade when the large single engine sweeper is in the sweep mode.

9. The large single engine sweeper system as defined in claim 6 wherein the predetermined maximum speed of the large single engine sweeper in the sweep mode is determined by the vehicle operator.

10. The large single engine sweeper as defined in claim 8 wherein the large single engine sweeper will reach the predetermined maximum speed when the variable position accelerator pedal is fully depressed.

11. The large single engine sweeper as defined in claim 1 will exit the sweep mode if the variable position accelerator pedal is not depressed for a predetermined period of time.

* * * * *